United States Patent
Tscherbner et al.

(10) Patent No.: US 8,789,888 B2
(45) Date of Patent: Jul. 29, 2014

(54) SEAT ASSEMBLY HAVING A BUTTON ASSEMBLY

(75) Inventors: Achim Tscherbner, Ingolstadt (DE); Timo Schroeder, Marzling (DE); Karsten Mueller, Ingolstadt (DE)

(73) Assignee: Lear Corporation, Southfield, MI (US)

( * ) Notice: Subject to any disclaimer, the term of this patent is extended or adjusted under 35 U.S.C. 154(b) by 391 days.

(21) Appl. No.: 13/151,630

(22) Filed: Jun. 2, 2011

(65) Prior Publication Data
US 2012/0007404 A1 Jan. 12, 2012

(30) Foreign Application Priority Data
Jul. 6, 2010 (DE) .......................... 10 2010 030 967

(51) Int. Cl.
B60N 2/48 (2006.01)

(52) U.S. Cl.
USPC ........................................ 297/391; 297/463.1

(58) Field of Classification Search
USPC ................ 297/391, 408, 410, 463.1, 463.2
See application file for complete search history.

(56) References Cited

U.S. PATENT DOCUMENTS

| | | | |
|---|---|---|---|
| 4,990,731 A | 2/1991 | Wu et al. | |
| 5,706,705 A * | 1/1998 | Stringer | 74/502 |
| 6,910,740 B2 * | 6/2005 | Baker et al. | 297/408 |
| 7,431,400 B2 * | 10/2008 | Brawner | 297/408 |
| 7,669,932 B1 | 3/2010 | Gronninger et al. | |
| 7,901,008 B2 * | 3/2011 | Follesa et al. | 297/410 |
| 8,025,338 B2 | 9/2011 | Brunner et al. | |
| 2006/0214491 A1 | 9/2006 | Metz et al. | |
| 2009/0079250 A1 | 3/2009 | Follesa et al. | |
| 2010/0045090 A1 * | 2/2010 | Brunner et al. | 297/408 |
| 2010/0236911 A1 * | 9/2010 | Wild et al. | 200/345 |

FOREIGN PATENT DOCUMENTS

| | | |
|---|---|---|
| DE | 102006026029 A1 | 12/2007 |
| DE | 102006049053 A1 | 3/2008 |
| DE | 102008015336 A1 | 10/2009 |
| EP | 0515943 A2 | 12/1992 |

OTHER PUBLICATIONS

German Patent & Trademark Office, Office Action for the corresponding German Patent Application No. 10 2010 030 967.2-16 mailed Dec. 8, 2010.

State Intellectual Property Office of China, Office Action for the corresponding Chinese Patent Application No. 201110185868.X mailed Aug. 6, 2013.

* cited by examiner

*Primary Examiner* — Philip Gabler
(74) *Attorney, Agent, or Firm* — Brooks Kushman P.C.

(57) ABSTRACT

A seat assembly having a button assembly. The button assembly includes a bezel having a ramp feature and a button having a feedback arm that engages the ramp feature. Movement of at least a portion of a seat component is permitted when sufficient force is applied to the button.

20 Claims, 4 Drawing Sheets

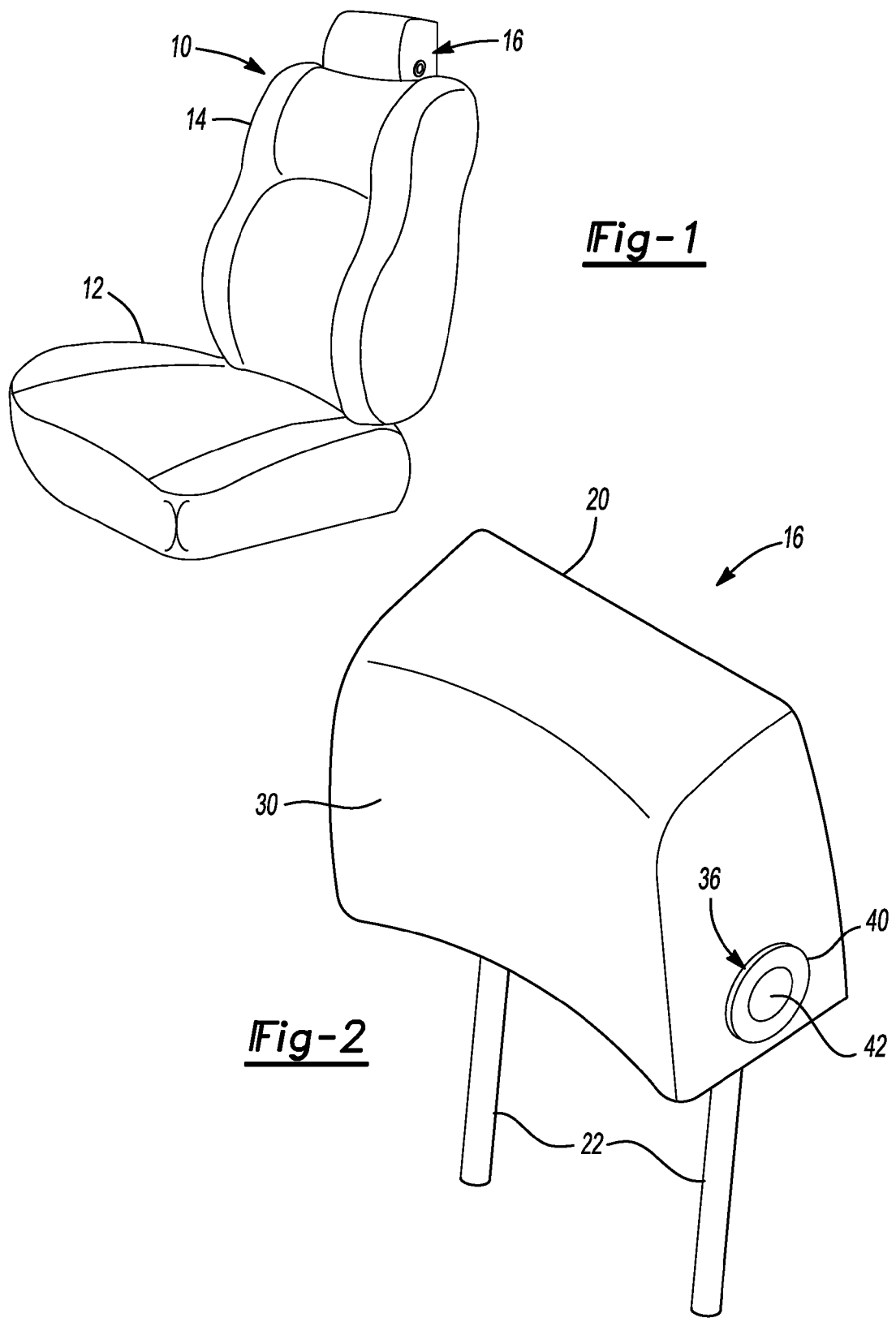

SEAT ASSEMBLY HAVING A BUTTON ASSEMBLY

CROSS-REFERENCE TO RELATED APPLICATIONS

This application claims foreign priority benefits under 35 U.S.C. §119(a)-(d) to DE 10 2010 030 967.2, filed Jul. 6, 2010, which is hereby incorporated by reference in its entirety.

TECHNICAL FIELD

The present invention relates to a seat assembly having a button assembly.

SUMMARY

In at least one embodiment, a seat assembly is provided. The seat assembly includes a button assembly having a bezel and a button. The bezel at least partially defines an opening and has a ramp feature. The button is moveably disposed in the opening and has a feedback arm that engages the ramp feature and an engagement arm that engages a latching mechanism. The latching mechanism is released to permit movement of at least a portion of a seat component when sufficient force is applied to the button.

In at least one embodiment, a seat assembly is provided. The seat assembly has a headrest and a button assembly disposed on the headrest. The button assembly includes a bezel and a button. The bezel has an opening and a cross member that extends across the opening. The cross member has a ramp feature. The button is moveably disposed in the opening and has a feedback arm. The feedback arm cooperates with the ramp feature to provide tactile feedback when the button is actuated.

In at least one embodiment, a seat assembly is provided. The seat assembly includes a headrest and a button assembly. The button assembly includes a one-piece bezel, a one-piece button, and a biasing member. The bezel has an opening, a cross member that extends across the opening, and a ramp feature disposed on the cross member. The button is moveably disposed in the opening and has a feedback arm. The biasing member engages the cross member and the button and exerts a biasing force on the button. Movement of the headrest is permitted when the button is actuated.

BRIEF DESCRIPTION OF THE DRAWINGS

FIG. 1 is a perspective view of an exemplary seat assembly.

FIG. 2 is a perspective view of an exemplary head restraint assembly.

DETAILED DESCRIPTION

Figure 3:
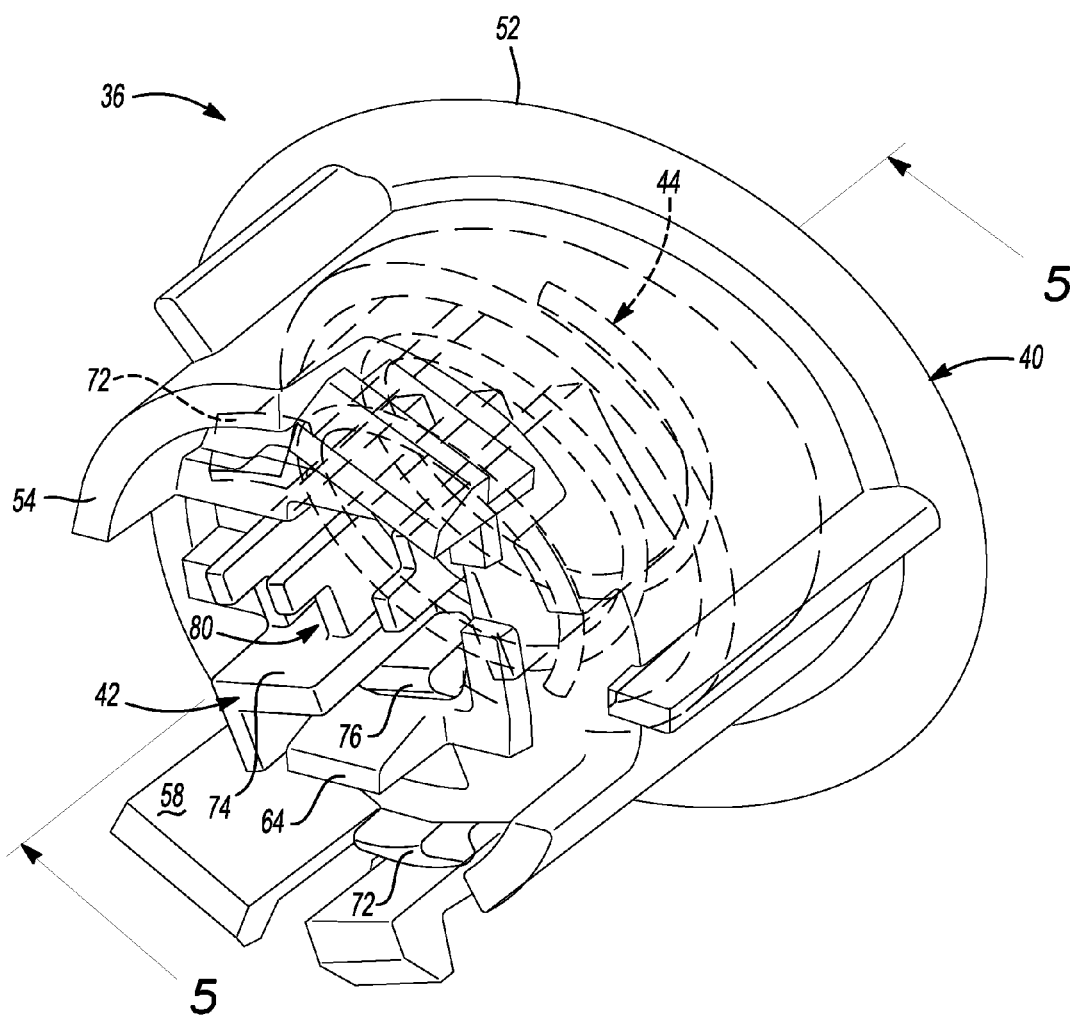
FIG. 3 is a perspective view of an exemplary button assembly.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIG. 1, an exemplary seat assembly 10 is shown. The seat assembly 10 may be configured for use in a vehicle, such as a motor vehicle like a car or truck, or for non-automotive applications.

The seat assembly 10 may include a seat bottom 12 and a seat back 14. The seat bottom 12 may be configured to be mounted on a support surface, such as a floor pan of a vehicle. The seat back 14 may be pivotally disposed on the seat bottom 12 and may include a head restraint assembly 16.

Referring to FIG. 2, the head restraint assembly 16 may include a headrest 20 and one or more support posts 22. In at least one embodiment, the headrest 20 may be moveably disposed on the support post 22. Alternatively, the headrest 20 may be fixedly disposed on the support post 22 and the support post 22 may move with respect to the seat back 14. The support post 22 may extend through the top of the seat back 14 and may be made of any suitable material or materials, such as a metal like an aluminum or steel alloy.

Figure 5:
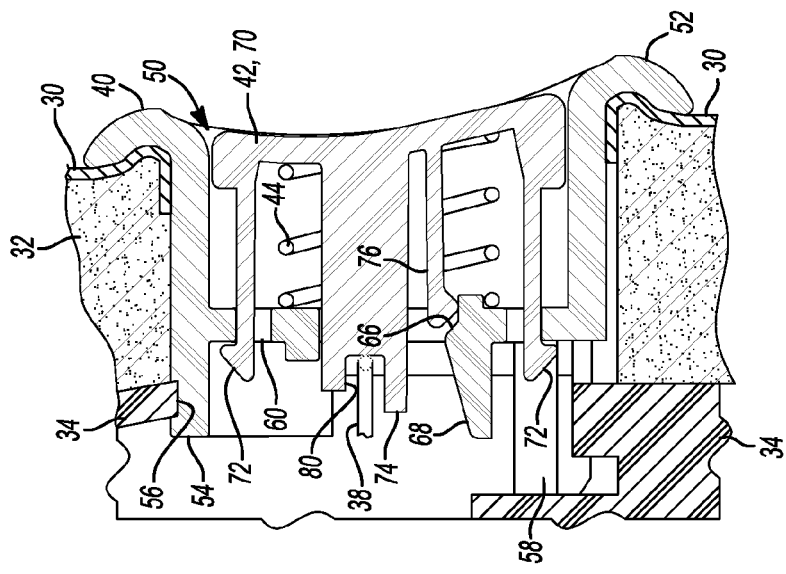

Referring to FIGS. 2 and 5, the headrest 20 may be configured to support the head of an occupant of the seat assembly 10. The headrest 20 may include a trim cover 30, a cushion 32, a structural member 34, and a button assembly 36. Alternatively, the button assembly 36 may be provided on another part of the seat assembly 10, such as the seat back 14.

The trim cover 30 may be provided on a visible exterior surface of the headrest 20. The trim cover 30 may be made of any suitable material or materials, such as a fabric, vinyl, leather, or the like. The trim cover 30 may cover the cushion 32, which may be disposed under at least a portion of the trim cover 30. The cushion 32 may be disposed proximate the structural member 34.

The structural member 34 may provide structural support for the headrest 20, trim cover 30, and/or the cushion 32. The structural member 34 may be configured to move along the support post 22 in embodiments in which the headrest 20 moves with respect to a support post 22. The structural member 34 may be made of any suitable material, such as a polymeric material.

Figure 4:
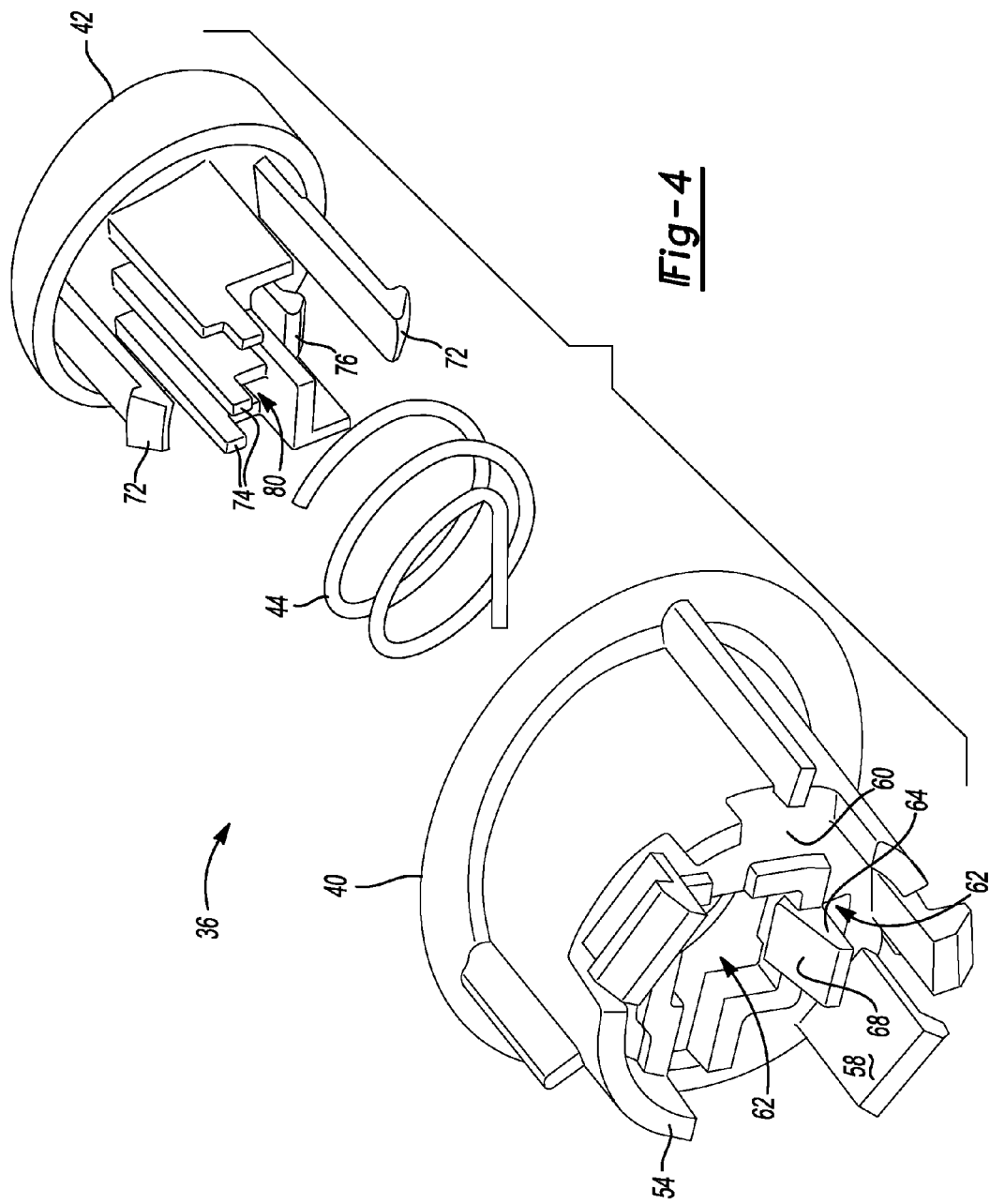
FIG. 4 is an exploded view of the button assembly.

Referring to FIGS. 3-5, the button assembly 36 may be provided to control operation of a portion of the seat assembly 10. For example, the button assembly 36 may be configured to operate or actuate a latching mechanism 38 to selectively enable or disable movement of at least a portion of the head restraint assembly 16. In at least one embodiment, the latching mechanism 38 may inhibit movement of the headrest 20 with respect to the support post 22 when in a locked condition and may permit movement when in an unlocked condition. Alternatively, the latching mechanism 38 may inhibit movement of the support post 22 with respect to the seat back 14 when in a locked condition and may permit movement when in an unlocked condition. In such embodiments, the latching mechanism 38 may engage a surface or notch on the support post 22 to inhibit movement in a manner known by those skilled in the art. The button assembly 36 may include a bezel 40, a button 42 and a biasing member 44.

The bezel 40 may facilitate mounting of the button assembly 36. For example, the bezel 40 may be disposed on the headrest 20 or another component, such as the seat back 14. The bezel 40 may include a body that at least partially defines an opening 50 for receiving the button 42. The bezel 40 may be made of any suitable material, such as a polymeric material, and may be integrally formed as a one-piece component.

The bezel 40 may have a first end 52 and a second end 54 disposed opposite the first end 52. The first end 52 may have a rim that may engage the trim cover 30 to help provide a desired aesthetic appearance.

The bezel 40 may include one or more mounting features, such as first and second mounting features 56, 58. In the embodiment shown, the first and second mounting features 56, 58 are configured to engage the structural member 34. The first and second mounting features 56, 58 may have any suitable configuration. In FIG. 5, the first mounting feature 56 is provided as a notch or indentation that receives a portion of the structural member 34 and the second mounting feature 58 is configured as a feedback arm that extends from the second end 54 of the bezel 40 to engage the structural member 34.

The bezel 40 may also include a cross member 60 that may be generally disposed in the opening 50. The cross member 60 may have a plurality of openings 62 that may help receive and position the button 42 and may have a ramp feature 64 that may cooperate with the button 42 to provide tactile feedback to a user when the button 42 is actuated as will be discussed in more detail below.

The ramp feature 64 may include a first ramp surface 66 and a second ramp surface 68. The first and second ramp surfaces 66, 68 may be disposed adjacent to each other and may extend at different angles from an apex. In the embodiment shown, the first ramp surface 66 is shorter than the second ramp surface 68. Alternatively, the configuration of the first and second ramp surfaces 66, 68 may be reversed such that the first ramp surface 66 is longer than the second ramp surface 68, which would move the apex or intersection of the first and second ramp surfaces 66, 68 to the left from the position shown in FIG. 5. In addition, the ramp feature 64 may be configured to flex or be disposed on a feedback arm in one or more embodiments.

The button 42 may be moveably received in the bezel 40. The button 42 may be made of any suitable material, such as a polymeric material, and may be integrally formed as a one-piece component. The button 42 may include a first surface 70 that may be engaged by a user when the button 42 is pressed. The button 42 may also include one or more guide arms 72, one or more latching mechanism engagement arms 74, and a feedback arm 76.

The guide arms 72 may generally extend away from a first surface 70 through an associated opening in the cross member 60 of the bezel 42. The guide arms 72 may have a distal end that is enlarged or has a barb that inhibits removal of the button 42 from the bezel 40.

The latching mechanism engagement arm 74 may be disposed between the guide arms 72. The latching mechanism engagement arm 74 may include a notch 80 that may be configured to engage and receive a portion of the latching mechanism 38.

The feedback arm 76 may be disposed between the guide arms 72 and may be spaced apart from the latching mechanism engagement arm 74. The feedback arm 76 may extend away from the first surface 70 and generally parallel to the guide arms 72 and/or the latching mechanism engagement arm 74. The feedback arm 76 may extend through a common opening in the cross member 60 as the latching mechanism engagement arm 74. The feedback arm 76 may be configured to engage the ramp feature 64 and provide feedback to the user when the button 42 is actuated. The feedback arm 76 may be configured to flex or not flex. For instance, the feedback arm 76 may be configured to flex in embodiments that engage a stationary ramp feature 64. Alternatively, the feedback arm 76 may be configured to not flex in embodiments that engage a flexible ramp feature 64. In addition, both the feedback arm 76 and ramp feature may be configured to flex when engaged.

The biasing member 44 may be disposed between the bezel 40 and the button 42. The biasing member 44 may exert a biasing force against the button 42 in a direction that extends away from the cross member 60. The biasing member 44 may be of any suitable type, such as a spring.

Figure 7:
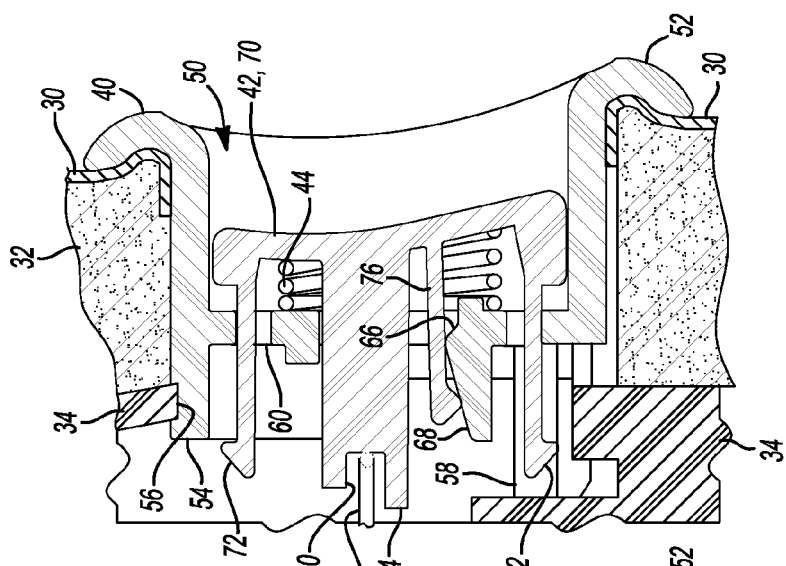
FIGS. 5-7 are exemplary section views depicting operation of the button assembly.
Figure 6:
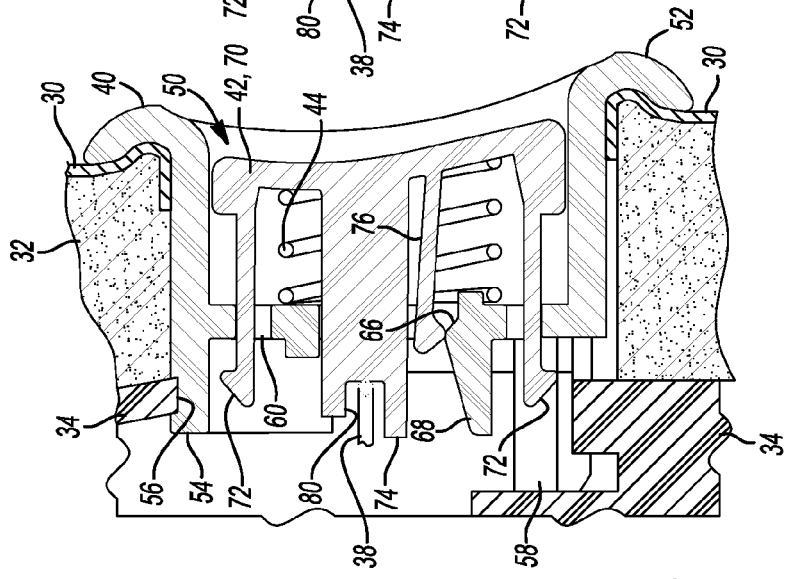

Referring to FIGS. 5-7, operation of the button assembly 36 is illustrated.

In FIG. 5, the button 42 is shown prior to actuation by a user. The button 42 is biased away from the cross member 60 by the biasing member 44. Movement of the button 42 away from the cross member 60 is limited by the guide arms 72. More specifically, the enlarged ends of the guide arms 72 may engage the cross member 60 along a surface disposed opposite the biasing member 44.

In FIG. 6, the button 42 is actuated with respect to the bezel 40. Actuation may occur in response to a sufficient actuation force exerted by a user upon the first surface 70 in a direction that extends toward the cross member 60 (i.e., to the left from the perspective shown in FIG. 6). A sufficient actuation force may overcome the biasing force exerted by the biasing member 44 and force exerted by the latching mechanism 38.

As the button 42 moves, the feedback arm 76 moves toward the ramp feature 64. As the feedback arm 76 engages the first ramp surface 66 the feedback arm 76 flexes toward the latching mechanism engagement arm 74. Maximum deflection of the feedback arm 76 may occur at the apex where the first and second ramp surfaces 66, 68 meet as shown in FIG. 6. The force required to actuate the button 42 along the first ramp surface 66 may be greater than the force required to actuate the button 42 prior to engaging the first ramp surface 66 due to the additional force required to push and flex the feedback arm 76 up or along the first ramp surface 66. In one or more embodiments, the actuation force may increase as the button 42 is actuated and the feedback arm 76 moves along the first ramp surface 66. Alternatively, the ramp feature 64 may flex in a similar manner in embodiments having a feedback arm 76 that is not configured to flex or in which both the ramp feature 64 and feedback arm 76 flex when engaged.

In FIG. 7, the button 42 is actuated further to the left. This further actuation of the button 42 causes the feedback arm 76 to move past the apex and begin to slide along the second ramp surface 68. As the feedback arm 76 slides along the second ramp surface 68, the feedback arm 76 flexes away from the latching mechanism engagement arm 74 and back toward its initial position. Alternatively, the ramp feature 64 may flex in a similar manner in embodiments having a feedback arm 76 that is not configured to flex or in which both the ramp feature 64 and feedback arm 76 flex when engaged. The force required to actuate the button 42 along the second ramp surface 68 may be less than the force required to actuate the button 42 along the first ramp surface 66. The difference in force may be due to one or more characteristics. First, additional force is not required to push and flex the feedback arm 76. Second, the flexing of the feedback arm 76 toward its initial position may help pull or actuate the button 42. As such, the feedback arm 76 may provide additional force that may cause the button 42 to "jump" and move faster or with less effort compared to movement along the first ramp surface 66. These characteristics or differences in actuation force may provide feedback or a tactile sensation to the user that indicates that the button 42 has been sufficiently actuated to unlock or to release the latching mechanism 38.

Movement of the button 42 can be limited by resistance caused by coil-to-coil engagement of the biasing member 44, engagement of the button 42 and the cross member 60, and/or sufficient resistance from the latching mechanism 38.

The button 42 may return to its initial position shown in FIG. 5 when a sufficient actuation force is not applied. More specifically, the button 42 may move back to the position in FIG. 5 in response to the biasing force exerted by the biasing member 44.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
 a button assembly having:
  a bezel that at least partially defines an opening, the bezel including a cross member that extends across the opening and a ramp feature; and
  a button moveably disposed in the opening, wherein the button has a feedback arm that extends through the cross member and engages the ramp feature when the button is actuated and an engagement arm that is completely spaced apart from the feedback arm and the ramp feature and that engages a latching mechanism;
 wherein the latching mechanism is released to permit movement of at least a portion of a seat component when sufficient force is applied to the button and wherein the feedback arm does not extend through the cross member to engage the ramp feature when the button is not actuated.

2. The seat assembly of claim 1 wherein the seat component is a headrest and the button assembly is disposed on the headrest.

3. The seat assembly of claim 1 wherein the feedback arm is configured to flex in response to engagement with the ramp feature.

4. The seat assembly of claim 1 wherein the ramp feature is configured to flex in response to engagement with the feedback arm.

5. The seat assembly of claim 1 wherein the ramp feature includes a first ramp surface and a second ramp surface that extends at an angle from the first ramp surface, wherein tactile feedback is provided when the feedback arm moves from the first ramp surface to the second ramp surface.

6. The seat assembly of claim 1 wherein the button further comprises a first guide arm that engages the bezel to inhibit removal of the button from the opening.

7. The seat assembly of claim 6 further comprising a biasing member and a second guide arm spaced apart from the first guide arm, wherein the biasing member is disposed between the first and second guide arms.

8. A seat assembly comprising:
 a headrest; and
 a button assembly disposed on the headrest, the button assembly including:
  a bezel disposed on the headrest, wherein the bezel has an opening, a cross member that extends across the opening, and a ramp feature disposed on the cross member;
  a button moveably disposed in the opening, wherein the button has a single feedback arm that does not extend through the cross member when the button is not actuated; and
  an engagement arm that engages a latching mechanism and does not engage the ramp portion;
 wherein the feedback arm cooperates with the ramp feature to provide tactile feedback when the button is actuated such that the ramp feature and the feedback arm flex when engaged and the button is actuated.

9. The seat assembly of claim 8 wherein the headrest includes a structural member and the bezel is disposed on the structural member.

10. The seat assembly of claim 9 wherein the bezel includes a first mounting feature, wherein the structural member is disposed in the first mounting feature.

11. The seat assembly of claim 10 wherein the bezel includes a second mounting feature, wherein the second mounting feature is disposed in a recess in structural member.

12. The seat assembly of claim 8 wherein the button includes a guide arm that extends through the cross member, wherein the guide arm cooperates with the cross member to retain the button in the opening.

13. The seat assembly of claim 12 wherein the engagement arm is spaced apart from the feedback arm and the guide arm.

14. The seat assembly of claim 13 wherein the engagement arm engages a latching mechanism and movement of the headrest is permitted when the button is actuated and inhibited when the button is not actuated.

15. The seat assembly of claim 8 further comprising a biasing member disposed between the cross member and the button.

16. A seat assembly comprising:
 a headrest; and
 a button assembly disposed on the headrest, the button assembly including:
  a one-piece bezel disposed on the headrest, wherein the bezel has an opening, a cross member that extends across the opening and that has a plurality of openings, and a ramp feature disposed on the cross member;
  a one-piece button moveably disposed in the opening, wherein the button has one feedback arm and a plurality of spaced apart engagement arms that each have a notch and that extend through an opening in the cross member, wherein the feedback arm is disposed between the ramp feature and the plurality of spaced apart engagement arms; and
  a biasing member that engages the cross member and the button and exerts a biasing force on the button in a direction that extends away from the cross member, wherein the biasing member extends around the plurality of spaced apart engagement arms and the feedback arm and the feedback arm does not extend through the opening in the cross member when the button is not actuated;
 wherein the movement of the headrest is permitted when the button is actuated.

17. The seat assembly of claim 16 wherein the feedback arm cooperates with the ramp feature to provide tactile feedback when the button is actuated.

18. The seat assembly of claim 16 wherein the engagement arms are disposed between a guide arm and the feedback arm and wherein the engagement arms engage a latching mechanism that selectively permits movement of the headrest.

19. The seat assembly of claim 18 wherein the feedback arm and the engagement arms extend through a common opening in the cross member.

20. The seat assembly of claim 18 wherein the button includes the guide arm, wherein the guide arm and feedback arm extend through different openings in the cross member.

\* \* \* \* \*